US008984422B2

(12) United States Patent
Eidelson et al.

(10) Patent No.: US 8,984,422 B2
(45) Date of Patent: Mar. 17, 2015

(54) GROUP CONVERSATION BETWEEN A PLURALITY OF PARTICIPANTS

(75) Inventors: Benjamin David Eidelson, Palo Alto, CA (US); Gregory Matthew Marra, San Francisco, CA (US); Jason B. Prado, San Francisco, CA (US); Fred Peter Gilbert, Mountain View, CA (US); Ye-Jeong Kim, Palo Alto, CA (US); Punit Singh Soni, Mountain View, CA (US); Aaron David Kemp, Kitchener, CA (US); Sharvil Nanavati, Dundas, CA (US); Jonathan Gordon Sharkey, Kitchener, CA (US); Anish Acharya, Toronto (CA); Sean Yaoxing Liu, Sunnyvale, CA (US); William C. Ferrell, Los Altos Hills, CA (US)

(73) Assignee: Google Inc., Mountain View, CA (US)

( * ) Notice: Subject to any disclaimer, the term of this patent is extended or adjusted under 35 U.S.C. 154(b) by 8 days.

(21) Appl. No.: 13/525,163

(22) Filed: Jun. 15, 2012

(65) Prior Publication Data

US 2012/0331405 A1 Dec. 27, 2012

Related U.S. Application Data

(60) Provisional application No. 61/501,163, filed on Jun. 24, 2011.

(51) Int. Cl.
*G06F 3/00* (2006.01)
*H04M 1/725* (2006.01)
*G06Q 50/00* (2012.01)
*G06F 3/01* (2006.01)

(52) U.S. Cl.
CPC ........... *H04M 1/72552* (2013.01); *G06Q 50/01* (2013.01)

USPC ........................... 715/758; 715/751; 715/752

(58) Field of Classification Search
USPC .......................................... 715/751, 752, 758
See application file for complete search history.

(56) References Cited

U.S. PATENT DOCUMENTS 5,880,731 A * 3/1999 Liles et al. ..................... 715/758
7,111,044 B2 9/2006 Lee
(Continued)

OTHER PUBLICATIONS

Blundell, "Review: PingChat 2 unites BlackBerry, iPhone and Android users through IM," CB Software Reviews, Aug. 30, 2011, <http://crackberry.com/review-pingchat-2-unites-blackberry-iphone-and-android-users-through-im>.

*Primary Examiner* — Nicholas Augustine
(74) *Attorney, Agent, or Firm* — McDermott Will & Emery LLP

(57) ABSTRACT

A system and method for presenting a group conversation on an electronic device of a user, via displaying, on a graphical user interface of the device, a group of contacts with which the user can communicate, the group of contacts comprising one or more individual contacts and one or more social circles which define a preset collection of contacts associated with one another. User input is received via the graphical user interface, the user input specifying a selection of participants from the group of contacts for a group conversation. The group conversation provides for sharing communication messages among the participants. A conversation window is presented on the graphical user interface. The conversation window displays a collection of contact icons with each contact icon respectively corresponding to one of the selected participants of the group conversation, and a conversation thread with the shared communication messages.

21 Claims, 19 Drawing Sheets

(56) References Cited

U.S. PATENT DOCUMENTS

| | | |
|---|---|---|
| 7,689,922 B2 | 3/2010 | Zaner et al. |
| 7,702,728 B2 | 4/2010 | Zaner et al. |
| 7,752,553 B2 * | 7/2010 | Pennington et al. ........... 715/751 |
| 8,032,470 B1 * | 10/2011 | Heidenreich et al. ........... 706/45 |
| 8,538,895 B2 * | 9/2013 | Appelman et al. ............. 705/319 |
| 8,639,229 B2 * | 1/2014 | Apfel et al. ................... 455/416 |
| 2001/0048449 A1 * | 12/2001 | Baker ........................... 345/758 |
| 2002/0130904 A1 * | 9/2002 | Becker et al. .................. 345/753 |
| 2004/0193692 A1 * | 9/2004 | Bottan et al. ................... 709/207 |
| 2006/0031772 A1 * | 2/2006 | Valeski ........................... 715/751 |
| 2008/0155029 A1 * | 6/2008 | Helbling et al. .............. 709/206 |
| 2009/0059922 A1 * | 3/2009 | Appelman et al. ............ 370/390 |
| 2009/0063995 A1 * | 3/2009 | Baron et al. ................... 715/753 |
| 2009/0287783 A1 * | 11/2009 | Beare et al. .................. 709/206 |
| 2010/0137010 A1 * | 6/2010 | Counts et al. ................. 455/466 |
| 2010/0205267 A1 * | 8/2010 | Klassen et al. ................ 709/206 |
| 2011/0010340 A1 | 1/2011 | Hung et al. |

* cited by examiner

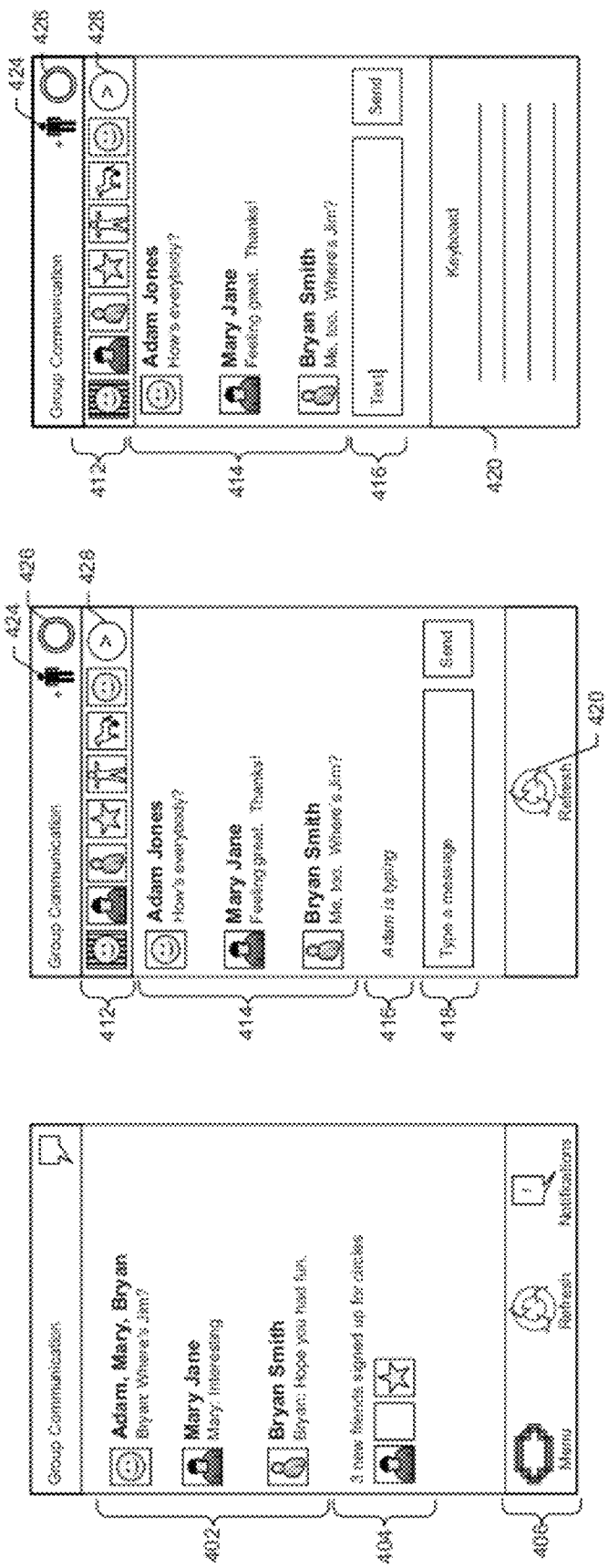

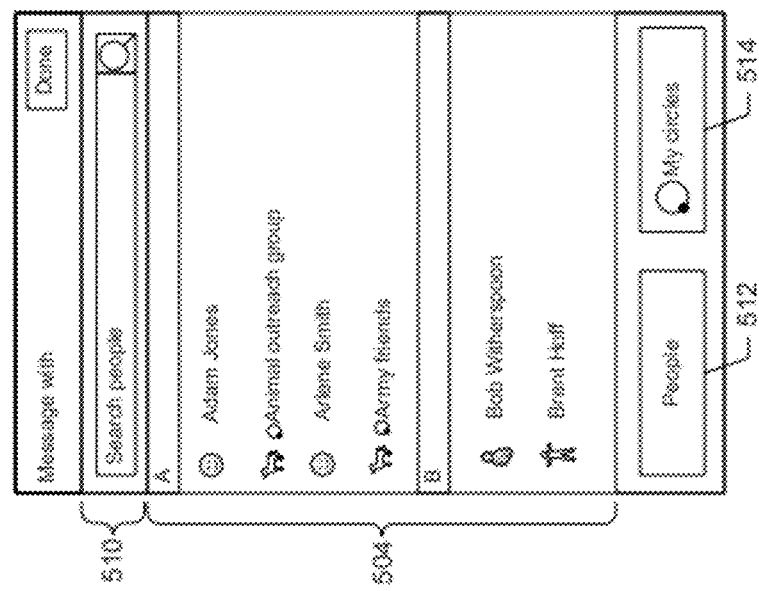
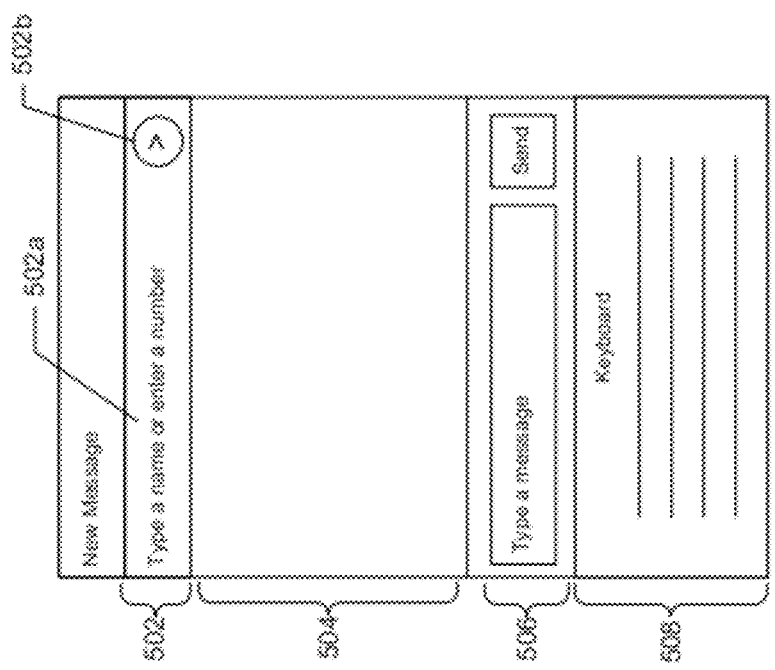
FIG. 5C

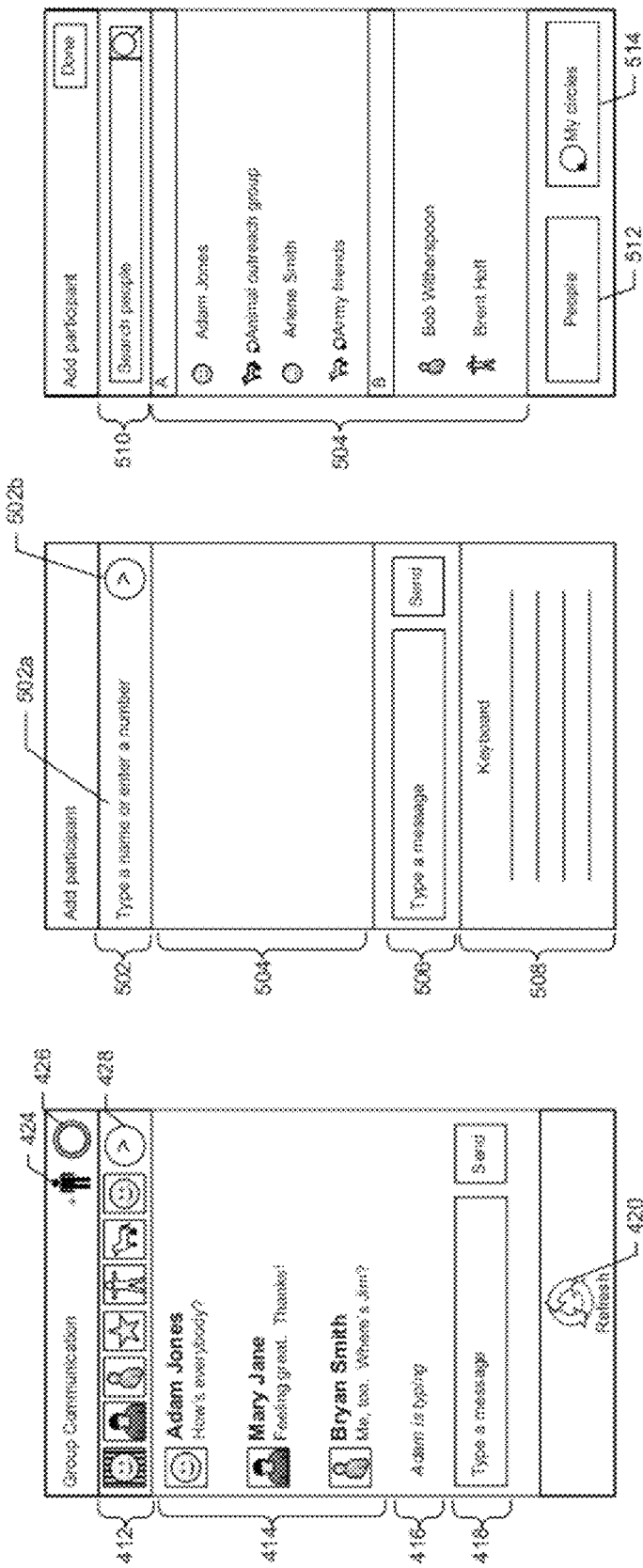

GROUP CONVERSATION BETWEEN A PLURALITY OF PARTICIPANTS

CROSS-REFERENCE TO RELATED APPLICATION

The present application claims the benefit of U.S. Provisional Patent Application Ser. No. 61/501,163, entitled "Group Conversation Between A Plurality Of Participants," filed on Jun. 24, 2011, the contents of which are hereby incorporated by reference in its entirety for all purposes.

BACKGROUND

The subject disclosure generally relates to communication between users of electronic devices, and, in particular, to group conversation between a plurality of participants When using electronic devices such as computers, cell phones or personal digital assistants (PDAs), it is possible to communicate with people on a 1:1 basis via text messaging, phone calls). It is also possible to broadcast messages to the public, for example, via a computer-implemented social networking service.

However, it is difficult to participate in ongoing electronic conversation with a select group of people. For example, the user of an electronic device may want to contact his/her family, friends, or a small group of work colleagues. Thus, a quicker and more convenient way to initiate communication with a select group of people, and to participate in an ongoing conversation with that group, may be desirable.

SUMMARY

The disclosed subject matter relates to a machine-implemented method for presenting a group conversation on an electronic device of a user, via displaying, on a graphical user interface of the electronic device, a group of contacts with which the user can communicate, the group of contacts comprising one or more individual contacts and one or more social circles which define a preset collection of contacts associated with one another; receiving user input via the graphical user interface, the user input specifying a selection of participants from the group of contacts for a group conversation, wherein the group conversation provides for sharing communication messages among the participants; and presenting a conversation window on the graphical user interface based on the received user input, wherein the conversation window displays a collection of contact icons with each contact icon respectively corresponding to one of the selected participants of the group conversation, and a conversation thread with the shared communication messages.

The disclosed subject matter also relates to a system for presenting a group conversation on an electronic device of a user, the system comprising one or more processors; and a machine-readable medium comprising instructions stored therein, which when executed by the processors, cause the processors to perform operations comprising displaying, on a graphical user interface of the electronic device, a group of contacts with which the user can communicate, the group of contacts comprising one or more individual contacts and one or more social circles which define a preset collection of contacts associated with one another; receiving first user input via the graphical user interface, the first user input specifying a selection of participants from the group of contacts for a group conversation, wherein the group conversation provides for sharing communication messages among the participants; receiving second user input via the graphical user interface, the second user input comprising a communication message for inclusion in the group conversation; and presenting a conversation window on the graphical user interface based on the received first and second user input, wherein the conversation window displays a collection of contact icons with each contact icon respectively corresponding to one of the selected participants of the group conversation, and a conversation thread which includes the communication message.

The disclosed subject matter also relates to a machine-readable medium comprising instructions stored therein, which when executed by a machine, cause the machine to perform operations comprising displaying, on a graphical user interface of an electronic device of a user, a group of contacts with which the user can communicate, the group of contacts comprising one or more individual contacts and one or more social circles which define a preset collection of contacts associated with one another; receiving user input via the graphical user interface, the user input specifying a selection of participants from the group of contacts for a group conversation, wherein the group conversation provides for sharing communication messages among the participants; presenting a conversation window on the graphical user interface based on the received user input, wherein the conversation window displays a collection of contact icons with each contact icon respectively corresponding to one of the selected participants of the group conversation, and a conversation thread with the shared communication messages; receiving a communication message for inclusion in the group conversation from the user via the graphical user interface; and updating the conversation window to display the communication message within the conversation thread.

The disclosed subject matter further relates to a method for assigning contacts to a social circle for a user of an electronic device, the social circle defining a preset collection of contacts associated with one another, via receiving first user input via, a graphical user interface on the electronic device, the first user input requesting identification of a plurality of participants of a group conversation which the user is participating in, wherein the group conversation provides for sharing communication messages among the plurality of participants; displaying, for each of the plurality of participants, a contact icon and identification information corresponding to the participant on the graphical user interface; receiving second user input via the graphical user interface, the second user input requesting that the plurality of participants be assigned to the social circle; and assigning the plurality of participants to the social circle.

The disclosed subject matter further relates to a system for assigning contacts to a social circle for a user of an electronic device, the social circle defining a preset collection of contacts associated with one another, the system comprising one or more processors; and a machine-readable medium comprising instructions stored therein, which when executed by the processors, cause the processors to perform operations comprising receiving first user input via a graphical user interface of the electronic device, the first user input requesting identification of a plurality of participants of a group conversation which the user is participating in, wherein the group conversation provides for sharing communication messages among the plurality of participants; displaying, for each of the plurality of participants, a contact icon and identification information corresponding to the participant on the graphical user interface; receiving second user input via the graphical user interface, the second user input requesting that the plurality of participants be assigned to the social circle; assigning the plurality of participants to the social circle; and transmitting an indication to each of the plurality of participants, the indication informing each of the plurality of participants of membership in the social circle.

The disclosed subject matter also relates to a machine-readable medium comprising instructions stored therein, which when executed by a machine, cause the machine to perform operations comprising receiving first user input via a graphical user interface of an electronic device of a user, the first user input requesting identification of a plurality of participants of a group conversation which the user is participating in, wherein the group conversation provides for sharing communication messages among the plurality of participants; displaying, for each of the plurality of participants, a contact icon and identification information corresponding to the participant on the graphical user interface; receiving second user input via the graphical user interface, the second user input requesting that the plurality of participants be assigned to a social circle, the social circle defining a preset collection of contacts associated with one another; transmitting an invitation message to each of the plurality of participants; receiving a confirmation indication from at least one of the plurality of participants; and assigning the at least one of the plurality of participants to the social circle in response to receiving the confirmation indication.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

FIGS. 4A to 4C illustrate screen-shots of an example graphical user interface for participating in a group conversation.

FIGS. 5A to 5D illustrate screen-shots of an example graphical user interface for selecting participants and initiating a new group conversation.

FIGS. 6A to 6C illustrate screen-shots of an example graphical user interface for adding one or more participants to a group conversation already in progress.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As used herein, social circles are categories to which a user can assign their social networking contacts and better control the distribution and visibility of social networking messages. In accordance with the subject disclosure, a social circle is provided as a data set defining a collection of contacts that are associated with one another. As used herein, a social circle can be described from the perspective of an individual that is the center of a particular collection of socially interconnected people, or from the aggregate perspective of a collection of socially interconnected people. In some examples, a social circle can have narrowly defined boundaries, all of the members of the social circle may be familiar with one another, and permission may be required for a member to join a social circle. In accordance with the subject disclosure, a user of an electronic device may define a social circle, and the social circle, as a data set defining a collection of contacts, may reflect a real-life social circle of the user.

For example, a user of an electronic device may have different groups of friends, coworkers, and family, and there may be some overlap among those groups (e.g., a coworker who is also considered to be a friend, a family member who is also a coworker). Through the creation and use of social circles, the user can organize and categorize social networking contacts into various different groupings.

Figure 1:
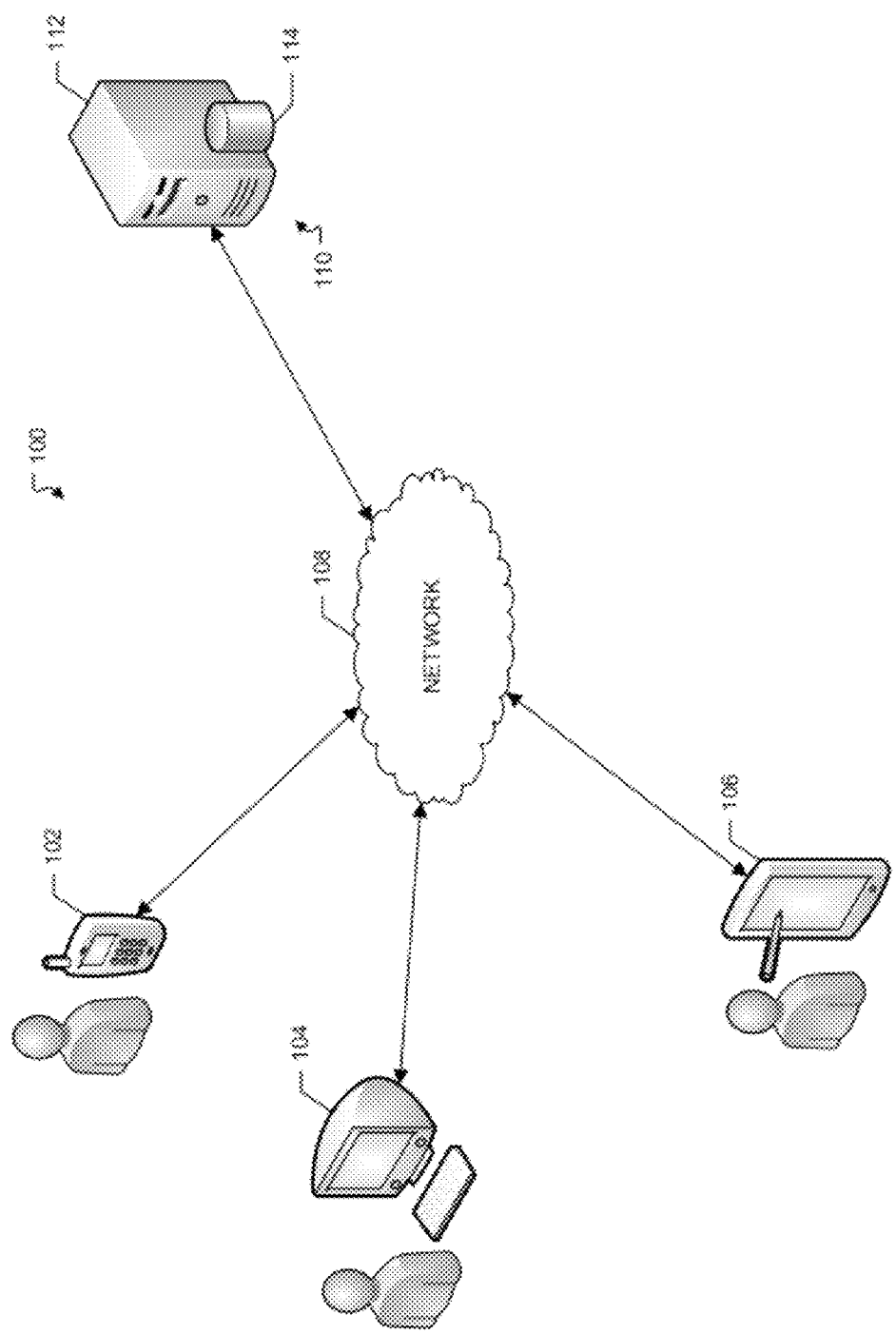
FIG. 1 illustrates an example client-server network environment which provides for group conversation.

FIG. 1 illustrates an example client-server network environment which provides for group conversation. A network environment 100 includes a number of electronic devices 102-106 communicably connected to a server 110 by a network 108. Server 110 includes a processing device 112 and a data store 114. Processing device 112 executes computer instructions stored in data store 114, for example, to assist in group conversation between electronic devices 102-106.

Users interacting with electronic devices 102-106 can participate in group conversation (e.g., using server 110), by posting messages such as text communications (e.g., comments, replies, announcements, status updates), digital photos, videos, or other appropriate electronic information. In some example embodiments, information can be posted on a user's behalf by systems and/or services external to server 110. For example, the user may post a review of a movie to a movie review website, and with proper permissions that website may include the review in the group conversation on the user's behalf. In another example, a software application executing on a mobile device (e.g., electronic device 102), with proper permissions, may use global positioning system (GPS) capabilities to determine the user's location and automatically update the social network with the user's location (e.g., "At Home", "At Work", "In Los Angeles, Calif.").

The posted messages can be formatted as text messages (e.g., SMS, MMS messages), email messages, instant messages, or other message formats for communication between electronic devices 102-106. For example, a communication message generated on electronic device 102 can correspond to Extensible Messaging and Presence Protocol (XMPP). The XMPP message can be received by a message service (not shown) and translated into an appropriate format for receipt by electronic devices 104-106. For example, the XMPP message can remain XMPP, can be translated into an email, SMS, MMS or message via the message service, or can be translated into a proprietary message format via the message service. The translated message can then be forwarded to electronic devices 104-106.

Users interacting with electronic devices 102-106 can also define social circles to organize and categorize the users relationships to other users within network 108. Examples of the creation and use of social circles are provided in the description of FIG. 3, and throughout the remainder of the subject disclosure.

In some example embodiments, electronic devices 102-106 can be computing devices such as laptop or desktop computers, smartphones, PDAs, portable media players, tablet computers, or other appropriate computing devices that can be used to for group conversation within a social network. In the example of FIG. 1, electronic device 102 is depicted as a smartphone, electronic device 104 is depicted as a desktop computer, and electronic device 106 is depicted as a PDA.

In some example aspects, server 110 can be a single computing device such as a computer server. In other embodiments, server 110 can represent more than one computing device working together to perform the actions of a server computer (e.g., cloud computing). Furthermore, network 108 can be a public communication network (e.g., the Internet, cellular data network, dialup modems over a telephone network) or a private communications network (e.g., private LAN, leased lines).

Figure 2:
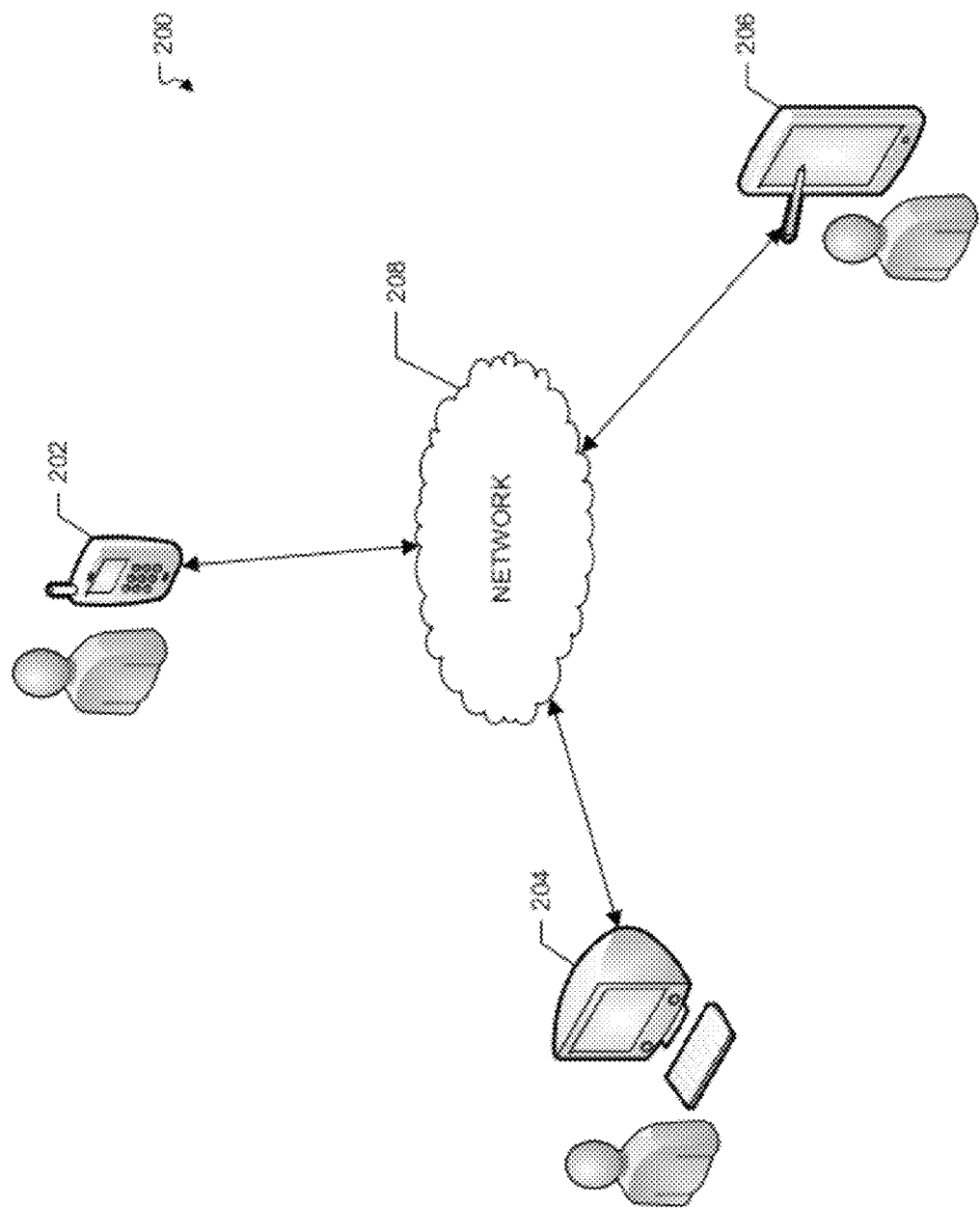
FIG. 2 illustrates an example peer-to-peer network environment which provides for group conversation.

FIG. 2 illustrates an example peer-to-peer network environment which provides for group conversation. A network environment 200 includes a number of electronic devices 202-206 communicably connected to one another in a peer-to-peer manner over a network 208.

Users interacting with electronic devices 202-206 can participate in group conversation by posting messages, such as text communications (e.g., comments, replies, announcements, status updates), digital photos, videos, or other appropriate electronic information. In some example embodiments, information can be posted on a user's behalf by external systems and/or services. For example, the user may post a review of a movie to a movie review website, and with proper permissions that website may include the review in the group conversation on the users behalf. In another example, a software application executing on a mobile device (e.g., electronic device 202), with proper permissions, may use global positioning system (GPS) capabilities to determine the users location and automatically update the social network with the user's location (e.g., "At Home", "At Work", "In Los Angeles, Calif.").

The posted messages can be formatted as text messages (e.g., SMS, MMS messages), email messages, instant messages, or other message formats for communication between electronic devices 202-206. For example, a communication message generated on electronic device 202 can correspond to Extensible Messaging and Presence Protocol (XMPP). The XMPP message can be received by a message service (not shown) and translated into an appropriate format for receipt by electronic devices 204-206. For example, the XMPP message can remain XMPP, can be translated into an email, SMS, MMS or message via the message service, or can be translated into a proprietary message format via the message service. The translated message can then be forwarded to electronic devices 204-206.

In the example peer-to-peer communication illustrated in FIG. 2, the logic for coordinating, group conversation between electronic devices 202-206 can be included in electronic devices 202-206 themselves, for example, by transmitting conversation identifiers between electronic devices 202-206. In addition, it is possible for electronic devices 202-206 to detect nearby conversations, and exchange messages and other information between participants of those conversations.

Users interacting with electronic devices 202-206 can also define social circles to organize and categorize the user's relationships to other users. Examples of the creation and use of social circles are provided in the description of FIG. 3, and throughout the remainder of the subject disclosure.

In some example embodiments, electronic devices 202-206 can be computing devices such as laptop or desktop computers, smartphones, personal digital assistants (PDAs), portable media players, tablet computers, or other appropriate computing devices that can be used for group conversation within a social network. In the example of FIG. 2, electronic device 202 is depicted as a smartphone, electronic device 204 is depicted as a desktop computer, and electronic device 206 is depicted as a PDA.

In some example aspects, network 208 can be a public communication network (e.g., the Internet, cellular data network, dialup modems over a telephone network) or a private communications network (e.g., private LAN, leased lines).

Figure 3:
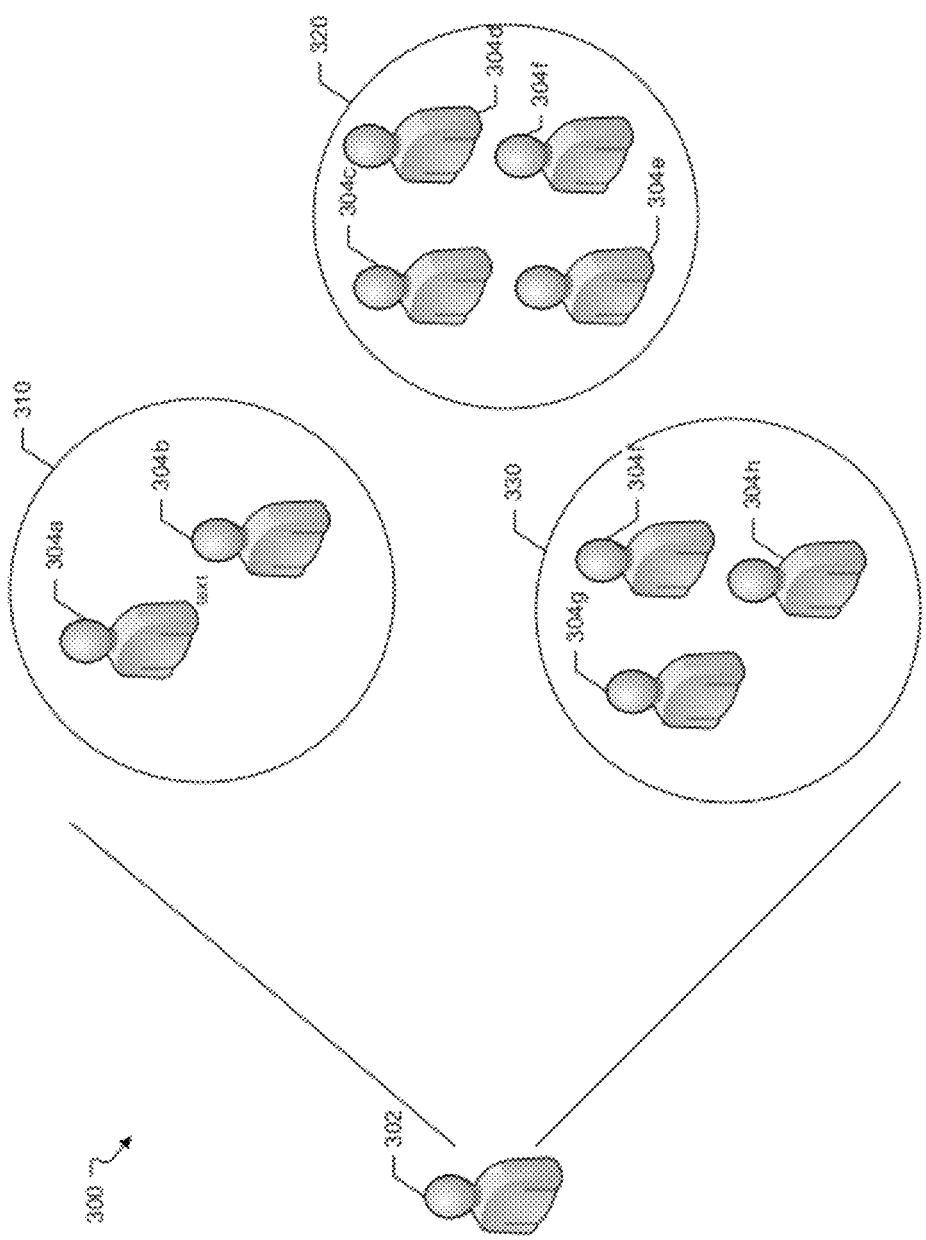
FIG. 3 illustrates an example social network including social circles.

FIG. 3 illustrates an example of social circles for a user. User 302 can participate in different group conversations with different social circles. Such group conversation can occur within a client-server environment (e.g., the environment of FIG. 1) or within a peer-to-peer environment (e.g., the environment of FIG. 2). In the example of FIG. 3, user 302 has a number of contacts 304*a*-304*h* with which user 302 can have some form of relationship (e.g., friends, coworkers, customers, teammates, clients, relatives, club members, classmates). User 302 can categorize contacts 304*a*-304*h* by assigning them to one or more social circles, such as social circle 310, social circle 330, and social circle 330.

In some example aspects, social circles 310-330 are groupings created by and may be known only to user 302 (e.g., contacts 304*a*, 304*b* may receive no indication that they are in user's 302 private social circle 310). In other example aspects, social circles are groupings created by user 302 and may be known to user 302 as well as the contacts (e.g., contacts 304a, 304h) that are members of the social circle (e.g., contacts 304a, 304b receive an indication that they have been added to social circle 310).

Social circles may be used to organize and categorize contacts 304a-304h in ways that are relevant to user 302. For example, user 302 may define social circles 310, 320 and 330 corresponding to family, friends and co-workers, respectively.

When initiating a group conversation, user 302 can select a combination of individuals and social circles for participation in the group conversation, where the participants can share in viewing and posting messages within the group conversation.

Once a social circle is created, user 302 can add (or invite) other people to join the social circle. In some example aspects, user 302 can specify individuals from his group of contacts for inclusion in the social circle. In other example aspects, while participating in a group conversation, user 302 can form a new circle with the participants of the group conversation, or can modify an existing social circle by adding the participants of the group conversation to that social circle. Furthermore, participants selected by user 302 can automatically be included in a social circle, and these participants can be notified. Alternatively, in some examples, the selected participants can be invited to opt into the social circle, with only those who accept membership joining the group conversation.

In some example aspects, one or more default social circles can be provided or suggested to user 302 on his/her electronic device. For example, "Friends," "Family," and "Coworkers" social circles can automatically be provided in a user's profile. Other social circles can automatically be provided including, for example, an "Acquaintances" social circle and/or a "Just Following" social circle. Although default social circles can be automatically provided, it may be left to the user to actually populate the default social circles with contacts. For example, each of the default social circles may initially be empty of contacts, where the user populates each of the default social circles.

In some example aspects, one or more default social circles can be automatically generated based on the user's profile information. For example, with proper permissions, the user's profile may include demographic data (e.g., age), job data and/or interests data (e.g., sports, hobbies). Through data mining techniques (e.g., clustering social circle creations over a threshold number of users) and user permission, it may be determined that users within a particular demographic typically create one or more particular types of social circles. By categorizing a user within a particular demographic, one or more particular default social circles can be suggested or automatically generated.

For example, if a particular user falls within a demographic that corresponds to a college student, a default "College Friends" social circle may be suggested to or automatically created for the user. Social circles can also be suggested or created based on interest data provided in a user's (profile. For example, if a particular user's interests include skiing, a default "Ski Buddies" social circle may be suggested to or automatically created for the user.

In some example aspects, during a message write-time, a data set can be used for coordination of the group conversation. For example, the data set can be transmitted from the users client device (e.g., electronic devices 102-106 of FIG. 1) to a distribution hub which can be provided at a server (e.g., server 110 of FIG. 1). In another example, the data set can be transmitted between client devices electronic devices 202-206 of FIG. 2), where the data set is processed primarily at each of the client devices to coordinate group conversation.

The data set can include a plurality of data. For example, the data set can include content data (e.g., text, uniform resource indicator (URI)), timestamp data (e.g., a timestamp indicating the time that the message was generated), distribution data (e.g., contacts and/or one or more social circles), and identification (ID) data an ID assigned to the data set upon generation of the message).

In some example aspects, the distribution data is processed to provide an access control list (ACL) that specifies which contacts are participants in a group conversation. In the case of a client-server environment (e.g., the network environment of FIG. 1), a distribution hub can determine end points the data set is to be distributed to based on the ACL. For example, the set of participants determined based on the ACL and the of the message is written to a per user/view index at the distribution hub. When fetching messages to distribute to a user, the user/view index is accessed and the Ms of the various messages that the user is allowed to view are determined. The data sets are retrieved from a data store (e.g., data store 114 of FIG. 1) and are transmitted to the client device (e.g., electronic device 102-106 of FIG. 1) associated with the user. Alternatively, in the case of peer-to-peer communication (e.g., the network environment of FIG. 2), the logic for transmitting and receiving data sets can be included in the client devices themselves, for example, by using conversation identifiers on each of the client devices.

FIGS. 4A to 4C illustrate screen-shots of an example graphical user interface for participating in a group conversation. In some example aspects, the graphical user interface of FIG. 4A illustrates the conversations, including 1-1 and group conversations, that user 302 is currently a participant of. These conversations are presented in a message list 402. In this example, message list 402 indicates that user 302 is currently a participant in three conversations, one of which is a group conversation, and two of which are 1-1 conversations.

The graphical user interface of FIG. 4A further illustrates an updates section 404. Updates section 404 may provide updates for user 302, including new friends who are signed up for social circles. In addition, the graphical user interface of FIG. 4A may include an options section 406, for providing user 302 with options such as returning to a main menu, refreshing the screen and reviewing notifications. The graphical user interface may also provide user 302 with the option to select and access a particular conversation. In the example of FIG. 4B, user 302 selects the group conversation within message list 402.

With reference to FIG. 4B, the graphical user interface provides for presentation of a group conversation. As shown in FIG. 4B, the graphical user interface can include a collection of contact icons 412, which represents the participants of the group conversation. In some example aspects, the contact icons 412 can be digital photos of the participants they represent, arbitrary images, or placeholders (e.g., when the contact has no image associated with their account). In some example aspects, the collection of icons 412 appear in a row at the top of the graphical user interface. A scroll bar (not shown) may also be provided for user 302 to access additional contact icons that may not fit into the initial view.

The graphical user interface of FIG. 4B further illustrates a conversation thread 414, which provides a history of messages posted for the group conversation. For example, for each message in conversation thread 414, the content and identification of participant can be shown. In some example aspects, a timestamp (not shown) indicating the time that the message was sent can also be displayed.

The graphical user interface may also include a typing indicator 416 which indicates which one(s) of the participants are currently typing a message for inclusion in the conversation thread 414. In addition, the graphical user interface may include a refresh button 420 for refreshing collection of contact icons 412 and/or conversation thread 414.

FIG. 4B further illustrates an message input box 418 for user 302 to enter and post new messages to conversation thread 414. In the event that user 302 selects to enter a new message (e.g., via input box 418), user 302 can be presented with a keyboard 422 for entering the message as shown in FIG. 4C.

The graphical user interface of FIG. 4B can also provide for an add participant button 424 for adding (or inviting) participants to a group conversation, as described in further detail below with reference to FIGS. 6A to 6C. FIG. 4B can further include a conversation settings button 426 to allow user 302 to change conversation settings, as described in further detail below with reference to FIG. 9B. The graphical user interface of FIG. 4B can also include a participant list button 428 for displaying the participants in a particular group conversation.

FIGS. 5A to 5D illustrate screen-shots of an example graphical user interface for selecting participants and initiating a new group conversation. As can be seen in these figures, the graphical user interface includes a participant dialog 502 for selecting participants of a group conversation, a contact list 504 for presenting the group of contacts for user 302, a message input box 506 for posting messages to the group conversation and a keyboard 508.

Participant dialog 502 can include a participant input box 502a for entering text, and a contact list button 502b for presenting contact list 504. For example, a participant can be selected by entering a name or phone number into participant input box 502a. The participants can correspond to existing contacts of user 302. Alternatively, participants who are not contacts of user 302 can be included, for example, by entering a phone number directly into participant input box 502a.

Figure 5A:
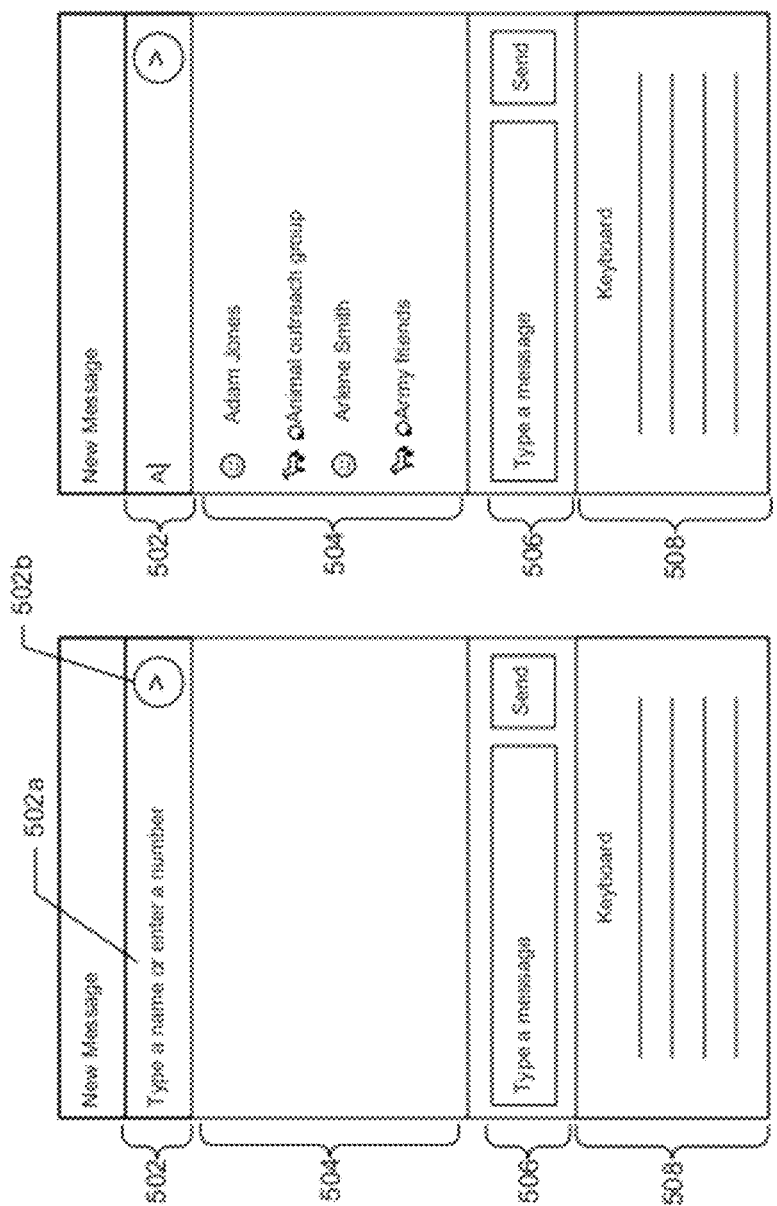

In some example aspects, upon user 302 entering text within participant input box 502a, contacts whose name (or number) matching the entered text can be presented within contact list 504. In the example of FIG. 5A, upon user 302 inputting "A" into participant input box 502a, contact list 504 can be filtered to show contact names beginning with "A." In some example aspects, an auto-complete component can be incorporated into participant input box 502a itself, to enable user 302 to type in part of the name (or number) of a social circle and/or individual contact to specify which social circles and/or individual contacts require delivery of a message.

Figure 5B:
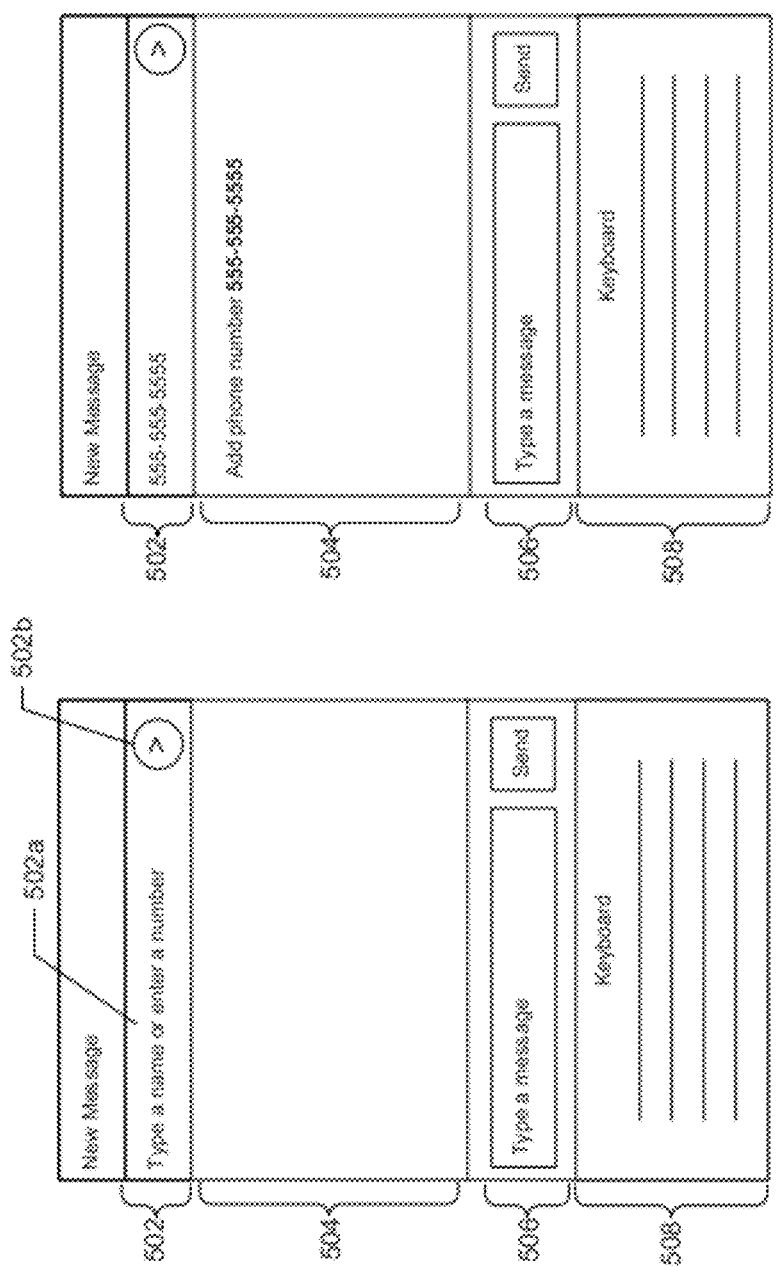

FIG. 5B illustrates an example of selecting a participant who is not an existing contact of user 302. In some example aspects, user 302 enters a phone number directly into participant input box 502a. As can be seen in FIG. 5, contact list 504 can provide the user with the option to add the entered phone number to the group conversation.

FIG. 5C illustrates that user 302 can select contact list button 502b to populate contact list 504. User 302 can select participants for the group conversation directly from contact list 504. As seen in the example of FIG. 5C, the graphical user interface can provide a participant search box 510 for searching within contact list 504, a button 512 for presenting individual contacts within contact list 504, and a button 514 for presenting social circles within contact list 504. As noted above, the participants can automatically be added to a group conversation, or can be invited to opt into or participate in the group conversation.

Figure 5D:
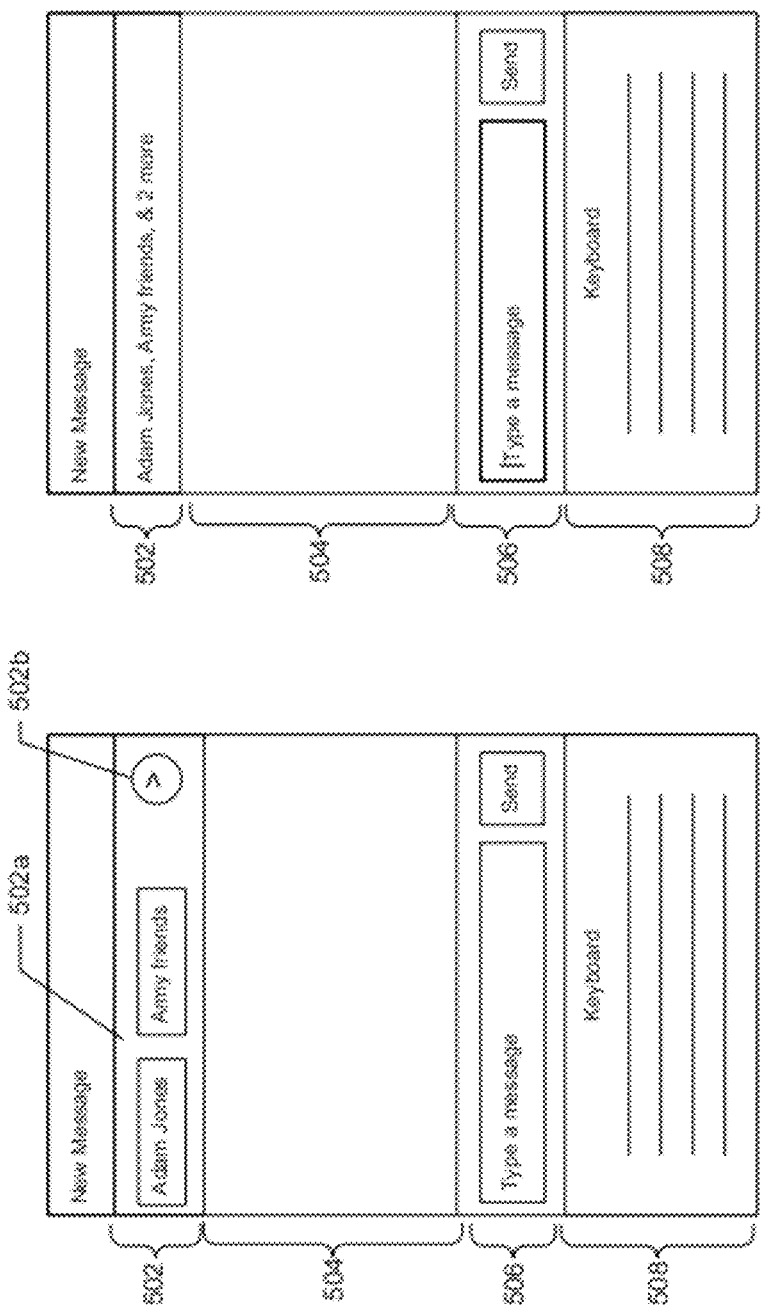

FIG. 5D illustrates a scenario in which user 302 has selected participants for the group conversation, and initiates the group conversation by posting a first message. In the example of FIG. 5D, participant dialog 502 displays the selected list of participants. It should be noted that user 302 can alter this list by entering (or removing) participants via participant input box 502a. Once user 302 has finalized his/her selection of participants, user 302 can post a first message for the group conversation via message input box 506 and keyboard 508. In some example aspects, this can initiate a group conversation and present user 302 with the graphical user interface corresponding to a group conversation (e.g., the graphical user interface of FIG. 4B).

FIGS. 6A to 6C illustrate screen-shots of an example graphical user interface for adding one or more participants to a group conversation already in progress. Regarding FIG. 6A, the interface for a group conversation can include collection of contact icons 412, conversation thread 414, typing indicator 416, message input box 418, refresh button 420, conversation settings button 426 and participant list button 428, as described above with reference to FIG. 4B.

The graphical user interface for the group conversation can further include an add participant button 424 to request the addition of participants to the group conversation. Upon making such a request, user 302 can be presented with a graphical user interface for selecting participants to be added to the group conversation. The participants can automatically be added to a group conversation, or can be invited to opt into the group conversation.

As can be seen in FIGS. 6B and 6C, the graphical user interface can include a participant dialog 502 (including a participant inbox box 502a and a contact list button 502b), a contact list 504, a message input box 506, a keyboard 508, a participant search box 510, and buttons 512 and 514 for respectively filtering contacts by individual or social circle. The functionality of the interface for FIGS. 6B and 6C is similar to that of FIGS. 5A to 5C and therefore will not be described in detail again. However, rather than selecting participants (bra new group conversation, the graphical user interfaces of FIGS. 6B and 6C allow user 302 to select participants to add to an existing group conversation. The participants can automatically be added to a group conversation, or can be invited to opt into the group conversation.

Figure 7C:
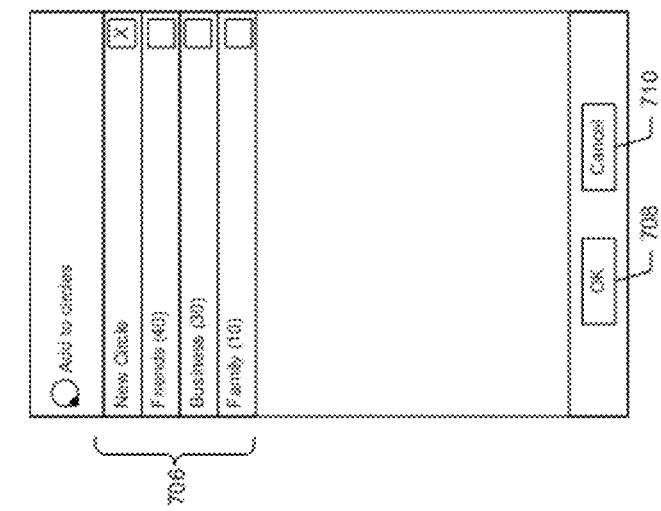
FIGS. 7A to 7C illustrate screen-shots of an example graphical user interface for selecting the participants of a group conversation for inclusion in a social circle.
Figure 7B:
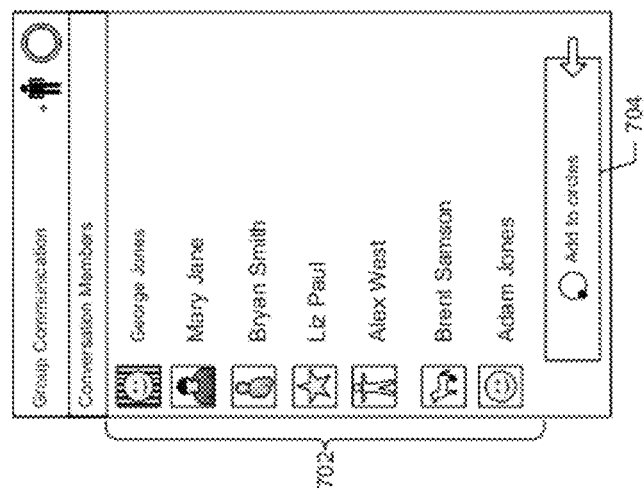
Figure 7A:
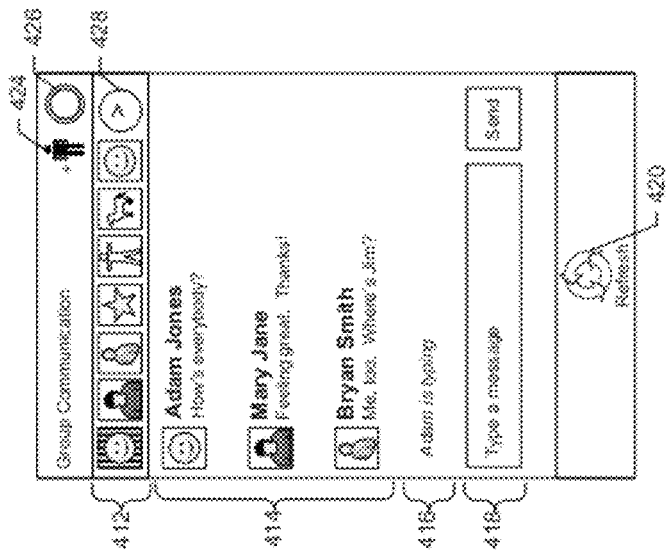

FIGS. 7A to 7C illustrate screen-shots of an example graphical user interface for selecting the participants of a group conversation for inclusion in a social circle. Regarding FIG. 7A, the interface for a group conversation can include collection of contact icons 412, conversation thread 414, typing indicator 416, message input box 418, refresh button 420, conversation settings button 426 and add participant button 424, as described above.

The graphical user interface for the group conversation can further include a participant list button 428. This button allows for the participants in a particular group conversation of user 302 to be displayed. As shown in the example of FIG. 7B, upon selection of participant list button 428 by user 302, a participant list 702 is displayed, including the icon and name of each participant in the group conversation. The graphical user interface of FIG. 7B further includes an add to circles button 704. This button allows for user 302 to define asocial circle, using the participants in the group conversation corresponding to participant list 702. In defining a social circle, user 302 can either create a new social circle with the participants or add the participants to an existing social circle.

FIG. 7C illustrates a graphical user interface including a social circle selection dialog 706. With this dialog, user 302 can specify whether a new social circle should be created for the participants of a group conversation (e.g., "New Circle"), or whether the participants should be added to an existing social circle (e.g., "Friends," "Business" and "Family"). The graphical user interface of FIG. 7C also includes an OK button 708 and a cancel button 710.

Figure 8A:
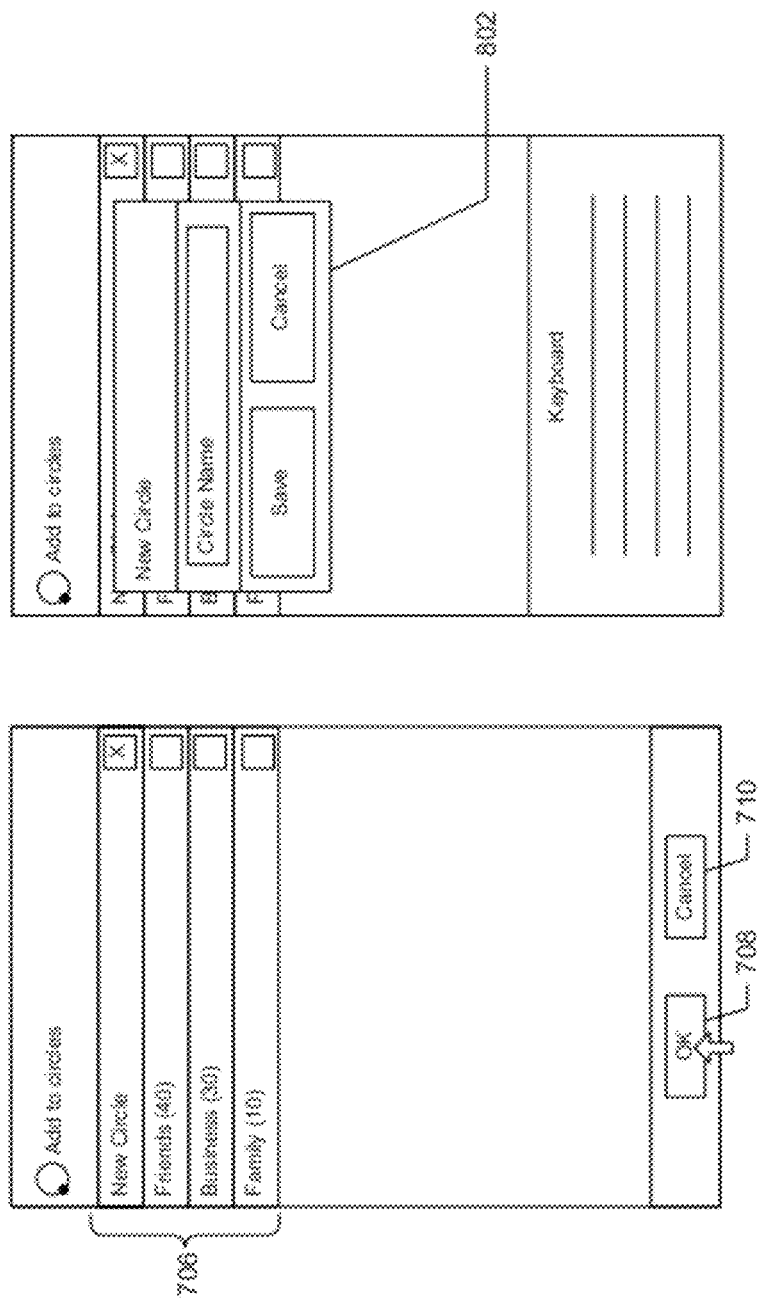
FIGS. 8A to 8B illustrate screen-shots of an example graphical user interface for assigning the participants selected in FIGS. 7A to 7C to a social circle.
Figure 8B:
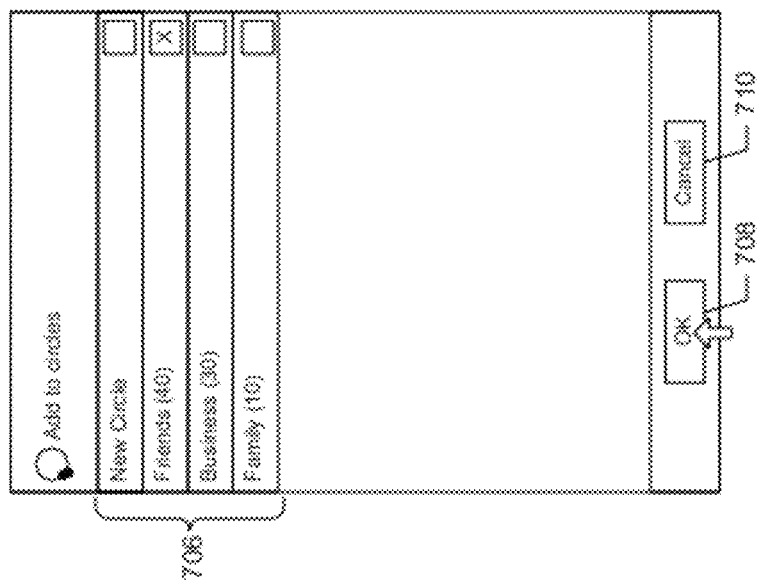

In this regard, FIGS. 8A to 8B illustrate screen-shots of an example graphical user interface for assigning the participants selected in FIGS. 7A to 7C to a social circle. In the example of FIG. 8A, user 302 selects to create a new circle for the participants. The graphical user interface provides user 302 with a new circle dialog 802 for inputting the name for the newly-created social circle. In the example of FIG. 8B, user 302 selects to add the participants to an existing social circle (e.g., to the "Friends" circle).

The participants can automatically be added to the social circle, or can be invited to opt into the social circle. A confirmation message (not shown) may be provided to user 302, confirming the addition of all (or some of) the participants.

Figure 9B:
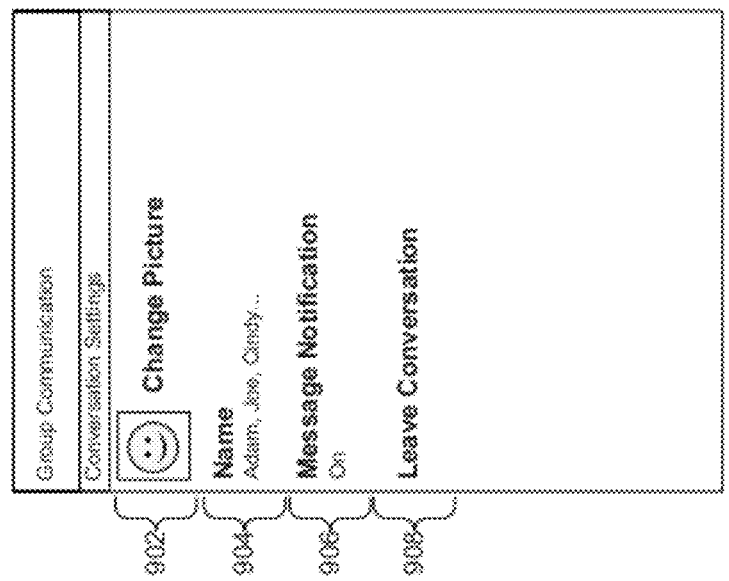
FIGS. 9A and 9B illustrate screen-shots of an example graphical user interface for configuring conversation settings for a user.
Figure 9A:
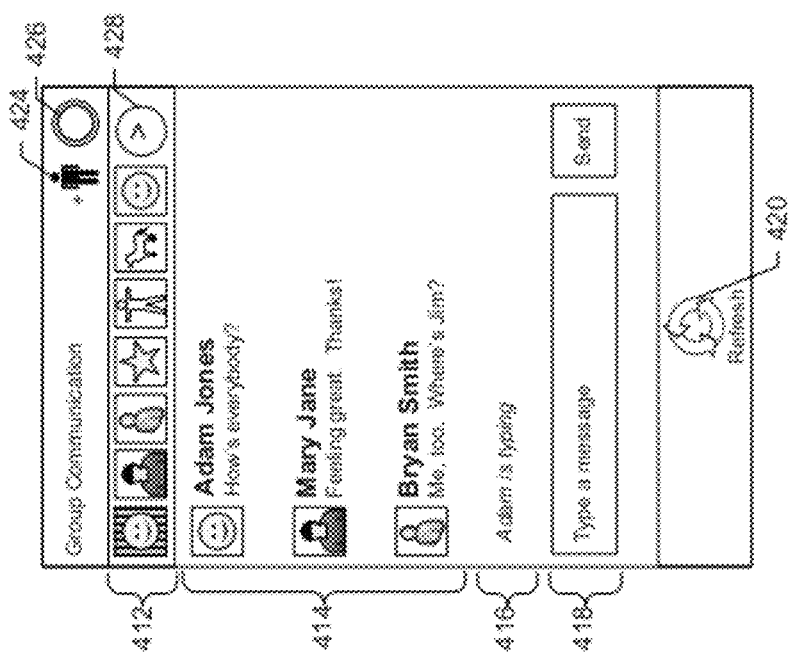

FIGS. 9A and 9B illustrate screen-shots of an example graphical user interface for configuring conversation settings for a user. Regarding FIG. 9A, the interface for a group conversation can include collection of contact icons 412, conversation thread 414, typing indicator 416, message input box 418, refresh button 420, add participant button 424 and participant list button 428.

The graphical user interface for the group conversation can further include a conversation settings button 426. This button can allow user 302 to change settings within a group conversation. In the example of FIG. 9B, user 302 is provided with a change picture option 902 for changing a picture associated with the group conversation (or with user 302), and a name option 904 for displaying and modifying adding, deleting) the participants in the group conversation. The graphical user interface also provides for a message notification option 906 for opting into or out of receiving message notifications, as described below. In addition, the graphical user interface provides for a leave conversation option 908, which allows for removal of user 302 from the group conversation.

Figure 10:
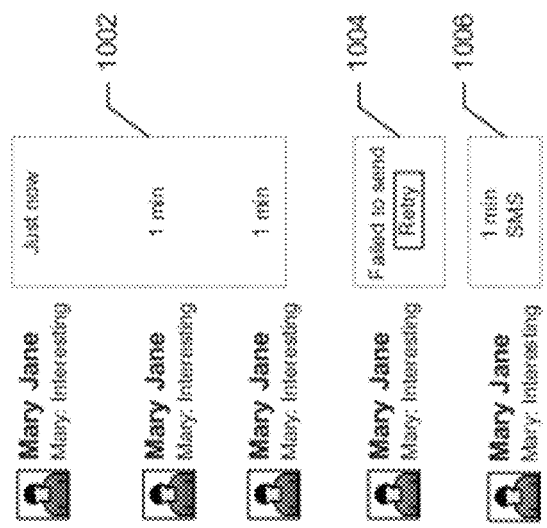
FIG. 10 illustrates screen-shots of an example graphical user interface for displaying the status of messages.

FIG. 10 illustrates screen-shots of an example graphical user interface for displaying the status of messages. As described above, it is possible to post messages, such as text (e.g., comments, replies, announcements, status updates), digital photos, videos, or other appropriate electronic information within conversation thread 414. Moreover, it is possible to display status information for items posted in conversation thread 414. In some example aspects, such status information can include a timestamp 1002 indicating when a message was posted, an indication 1004 that posting of a message failed, and an indication 1006 of the type of message that was sent (e.g., SMS, MMS).

Figure 11:
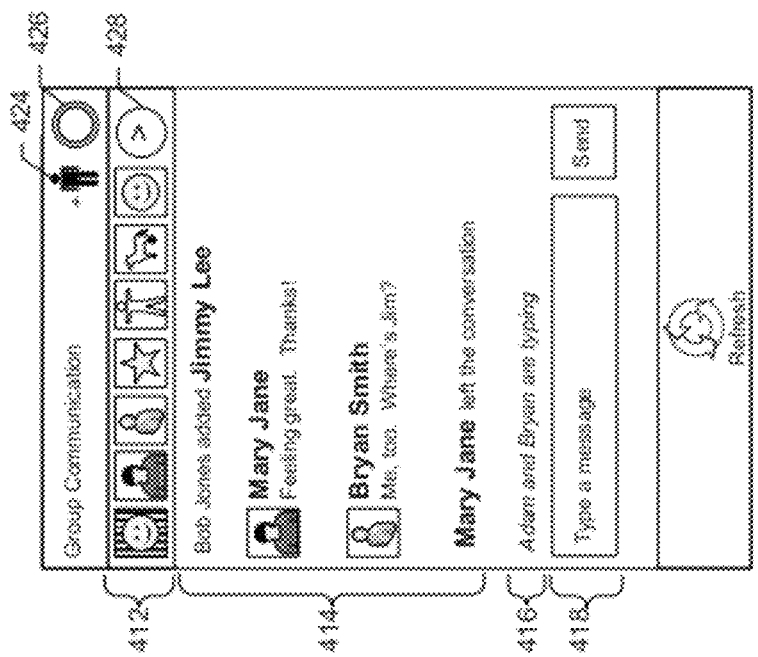
FIG. 11 illustrates a screen-shot of an example graphical user interface for displaying activity messages within a group conversation.

FIG. 11 illustrates a screen-shot of an example graphical user interface for displaying activity messages within a group conversation. In addition to the messages submitted by participants (e.g., text, digital photos, videos), activity messages related to participants of a group conversation can appear in communication thread 414, with proper permissions. In the example of FIG. 11, these activity messages include an indication that certain participants have been added to the group conversation, that certain participants have left the conversation, and that certain participants are currently typing in the group conversation. Of course, it should be noted that other activities related to the participants of the conversation can be tracked with proper permission, and that corresponding messages can be included in conversation thread 414.

Figure 12B:
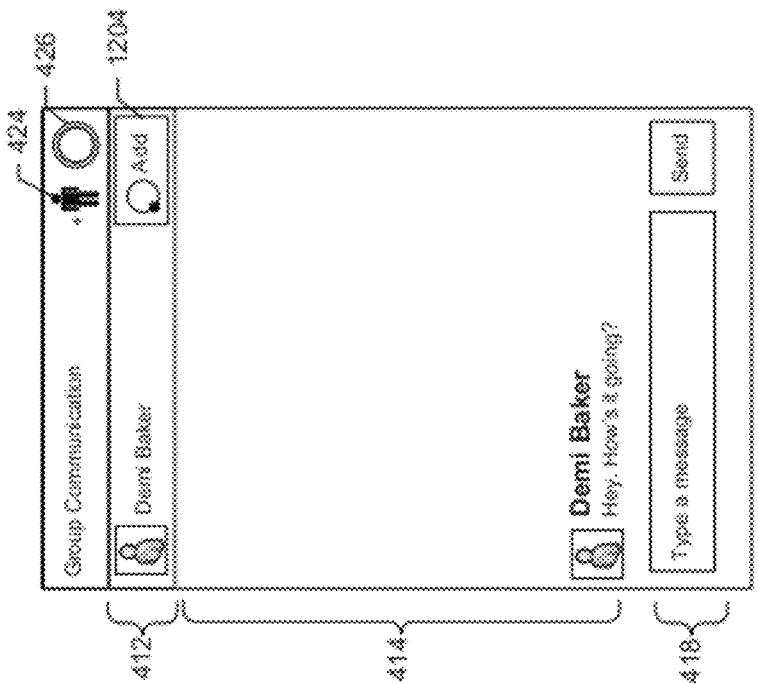
FIGS. 12A and 12B illustrate screen-shots of an example graphical user interface for receiving a request for participation in a group conversation.
Figure 12A:
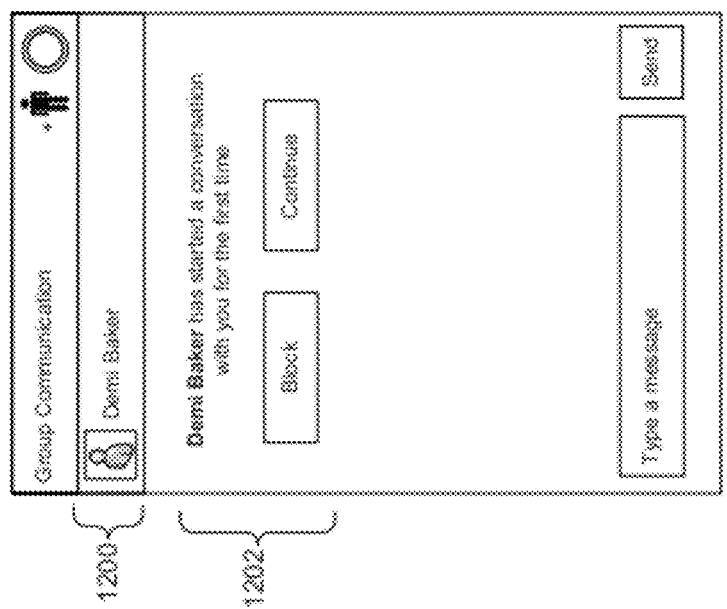

FIGS. 12A and 12B illustrate screen-shots of an example graphical user interface for receiving a request for participation in a group conversation. As described above, user 302 can invite others (e.g., individuals, members of a social circle) to participate in a 1-1 or in a group conversation. User 302 can also be invited by other users to participate within a 1-1 or group conversation, and this conversation may be new or existing.

As noted above, user 302 can opt to automatically be joined into group conversation. In this case, user 302 can be presented with a notification that he/she is now a participant of a conversation. In other example aspects, user 302 can accept or decline participation in a conversation. Thus, when user 302 is selected by another user for inclusion in a group conversation, user 302 may be provided with a request to accept or decline participation.

In the example of FIG. 12A, a graphical user interface provides user 302 with the participant(s) 1200 in a conversation, and a conversation invite 1202 allowing user 302 to accept (e.g., "continue") the conversation, or decline (e.g., "block") the conversation. The conversation can correspond to a 1-1 conversation in which case one participant 1200 can be displayed, or can correspond to a group conversation in which case multiple participants 1200 can be displayed. In the event that user 302 accepts, a communication window can be displayed, as shown in FIG. 12B. In the example of FIG. 12B, the participant communicating with user 302 is not an existing contact, and user 302 is presented with an add to circles button 1204 for adding that participant to a social circle.

Figure 13:
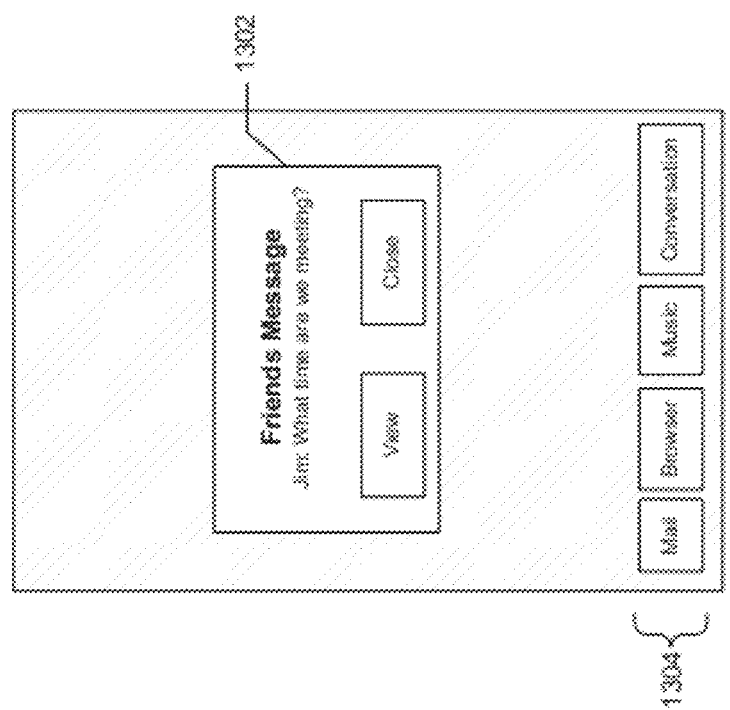
FIG. 13 illustrates a screen-shot of an example graphical user interface for notifying a user of a message within an existing conversation, when the user is not currently accessing the conversation.

FIG. 13 illustrates a screen-shot of an example graphical user interface for notifying a user of a message within an existing conversation, when the user is not currently accessing the conversation. As described earlier with reference to FIG. 4A, it is possible for user 302 to be involved in multiple conversations, including 1-1 and group conversations. In the event that user 302 is not currently accessing a conversation (e.g., when the user has electronic device 102-106 or electronic device 202-206 in his/her pocket), the user can be notified, with proper permissions, of messages from any of his/her conversations.

In this regard, FIG. 13 illustrates a message notification 1302 alerting user 302 that a new message was posted within a group conversation of his "Friends" social circle. FIG. 13 further illustrates interface elements 1304, which may correspond to an application home screen on the electronic device. Of course, message notification 1302 is not limited to presentation within a home screen, and can be displayed in other scenarios when the user is not currently accessing a particular conversation. In some example aspects, message notification 1302 can be accompanied by an optional audio or vibrate alert to notify user 302 of the new message.

Figure 14:
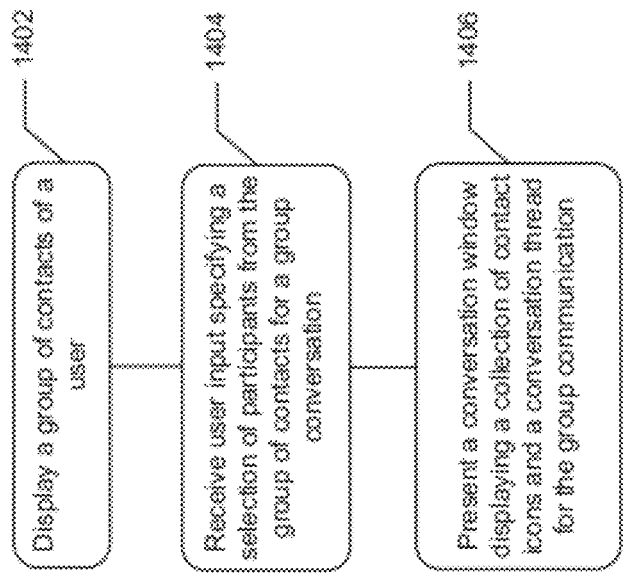
FIG. 14 illustrates a process by which a group conversation is presented on an electronic device of a user.

FIG. 14 illustrates a process by which a group conversation is presented on an electronic device of a user. At step 1402, a graphical user interface of the electronic device displays a group of contacts with which the user can communicate. The group of contacts includes one or more individual contacts and one or more social circles which define a preset collection of contacts associated with one another. At step 1404, user input is received via the graphical user interface. The user input specifies a selection of participants from the group of contacts for a group conversation. The group conversation provides for sharing communication messages among the participants.

At step 1406, a conversation window is presented on the graphical user interface based on the received user input. The conversation window displays a collection of contact icons with each contact icon respectively corresponding to one of the selected participants of the group conversation. The conversation window also displays a conversation thread for the group conversation.

Figure 15:
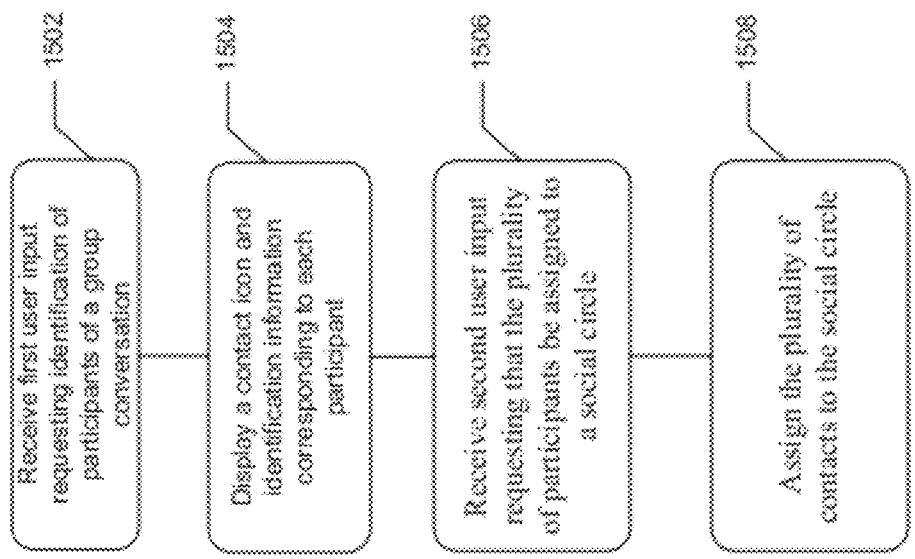
FIG. 15 illustrates a process by which contacts are assigned to a social circle for a user of an electronic device.

FIG. 15 illustrates a process by which contacts are assigned to a social circle for a user of an electronic device. The social circle defines a preset collection of contacts associated with one another. At step 1502, first user input is received via a graphical user interface on the electronic device. The first user input requests identification of a plurality of participants of a group conversation which the user is participating in. The group conversation provides for sharing communication messages among the plurality of participants. At step 1504, for each of the plurality of participants, the graphical user interface displays a contact icon and identification information corresponding to the participant.

At step 1506, second user input is received via the graphical user interface. The second user input requests that the plurality of participants be assigned to a social circle. At step 1508, the plurality of contacts are assigned to the social circle.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives. EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 16:
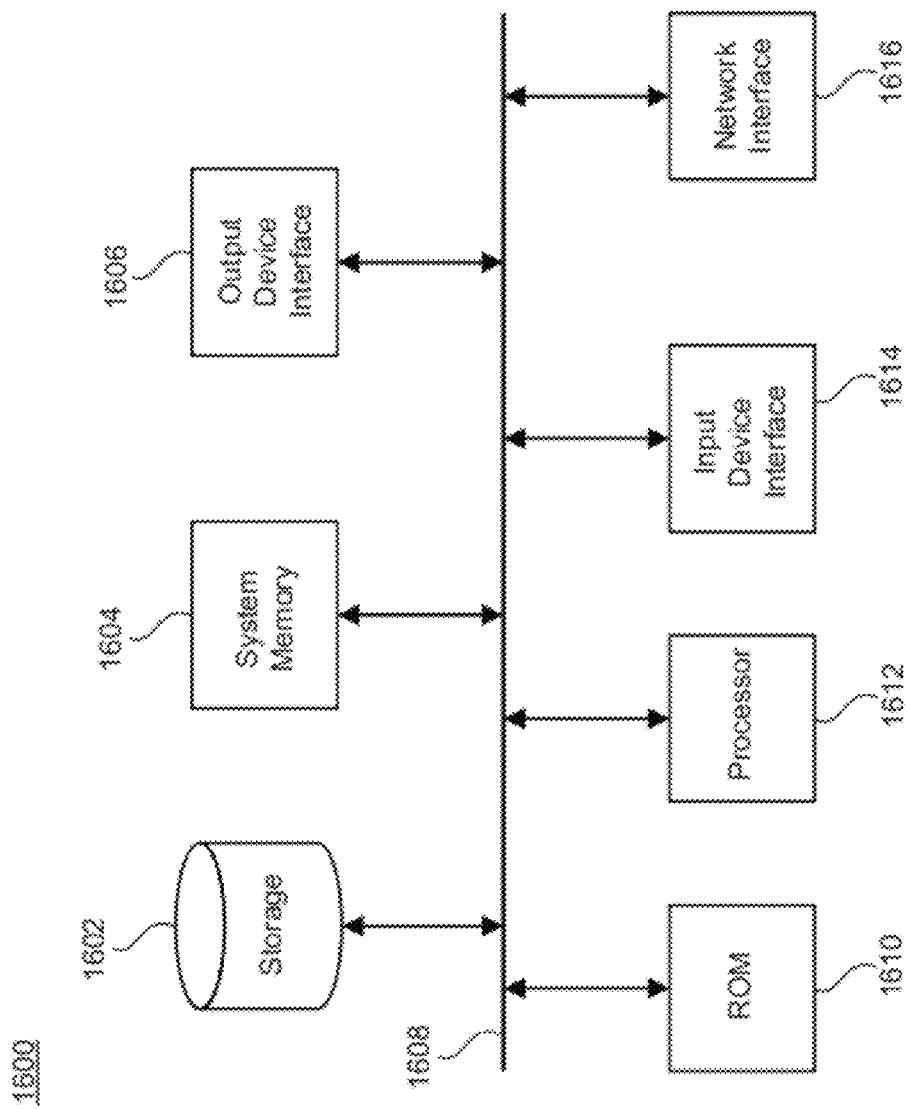
FIG. 16 conceptually illustrates an electronic system with which some implementations of the subject technology are implemented.

FIG. 16 conceptually illustrates an electronic system with which some implementations of the subject technology are implemented. Electronic system 1600 can be a computer, phone, PDA, or any other sort of electronic device. Such an electronic system includes various types of computer readable media and interfaces for various other types of computer readable media. Electronic system 1600 includes a bus 1608, processing unit(s) 1612, a system memory 1604, a read-only memory (ROM) 1610, a permanent storage device 1602, an input device interface 11614, an output device interface 1606, and a network interface 1616.

Bus 1608 collectively represents all system, peripheral, and chipset buses that communicatively connect the numerous internal devices of electronic system 1600. For instance, bus 1608 communicatively connects processing unit(s) 1612 with ROM 1610, system memory 1604, and permanent storage device 1602.

From these various memory units, processing unit(s) 1612 retrieves instructions to execute and data to process in order to execute the processes of the subject disclosure. The processing unit(s) can be a single processor or a multi-core processor in different implementations.

ROM 1610 stores static data and instructions that are needed by processing unit(s) 1612 and other modules of the electronic system. Permanent storage device 1602, on the other hand, is a read-and-write memory device. This device is a non-volatile memory unit that stores instructions and data even when electronic system 1600 is off. Some implementations of the subject disclosure use a mass-storage device (such as a magnetic or optical disk and its corresponding disk drive) as permanent storage device 1602.

Other implementations use a removable storage device (such as a floppy disk, flash drive, and its corresponding disk drive) as permanent storage device 1602. Like permanent storage device 1602, system memory 1604 is a read-and-write memory device. However, unlike storage device 1602, system memory 1604 is a volatile read-and-write memory, such a random access memory. System memory 1604 stores some of the instructions and data that the processor needs at runtime. In some implementations, the processes of the subject disclosure are stored in system memory 1604, permanent storage device 1602, and/or ROM 1610. For example, the various memory units include instructions for processing multimedia items in accordance with some implementations. From these various memory units, processing unit(s) 1612 retrieves instructions to execute and data to process in order to execute the processes of some implementations.

Bus 1608 also connects to input and output device interfaces 1614 and 1606. Input device interface 1614 enables the user to communicate information and select commands to the electronic system. Input devices used with input device interface 1614 include, for example, alphanumeric keyboards and pointing devices (also called "cursor control devices"). Output device interfaces 1606 enables, for example, the display of images generated by the electronic system 1600. Output devices used with output device interface 1606 include, for example, printers and display devices, such as cathode ray tubes (CRT) or liquid crystal displays (LCD). Some implementations include devices such as a touchscreen that functions as both input and output devices.

Finally, as shown in FIG. 16, bus 1608 also couples electronic system 1600 to a network (not shown) through a network interface 1616. In this manner, the computer can be a part of a network of computers (such as a local area network ("LAN"), a wide area network ("WAN"), or an Intranet, or a network of networks, such as the Internet Any or all components of electronic system 1600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for presenting a group conversation on an electronic device of a user, the method comprising:
    displaying, on a graphical user interface of the electronic device, a group of contacts with which the user can communicate, the group of contacts comprising one or more individual contacts and one or more preset collections of contacts associated with one another;
    receiving first user input via the graphical user interface, the first user input specifying a selection of at least one individual contact and at least one preset collection of contacts, from the group of contacts, as participants for a group conversation, wherein the group conversation provides for sharing communication messages among the participants;
    presenting a conversation window together with a first button on the graphical user interface based on the first user input, wherein the conversation window displays a collection of contact icons with each contact icon respectively corresponding to one of the participants of the group conversation, and wherein the first button is for displaying a participant list which includes all of the at least one individual contact and the at least one preset collection of contacts participating in the group conversation;
    receiving second user input via the first button;
    displaying, in response to the received second user input, the participant list together with a second button, wherein the second button is for creating a new preset collection of contacts with all participants in the participant list;
    receiving third user input via the second button; and
    creating, in response to the received third user input, the new preset collection of contacts with all participants in the participant list.

2. The method of claim 1, further comprising:
    receiving a communication message for inclusion in the group conversation from the user via the graphical user interface; and
    updating the conversation window to display the communication message within the conversation thread.

3. The method of claim 1, wherein the group conversation is initiated by the displaying, receiving and presenting steps.

4. The method of claim 1, wherein the group conversation is in progress with existing participants prior to the displaying step, and wherein participants are added to the group conversation by the displaying, receiving and presenting steps, the method further comprising:
    receiving a request from the user via the graphical user interface prior to the displaying step, the request for adding participants to the group conversation, wherein the selection of participants corresponds to the added participants, and wherein the conversation window displays the collection of contact icons with each contact icon respectively corresponding to one of the existing participants or the added participants.

5. The method of claim 1, wherein the group conversation is coordinated between the participants using a server.

6. The method of claim 1, wherein the group conversation corresponds to peer-to-peer communication between the participants, and wherein the group conversation coordinated by electronic devices of the participants.

7. The method of claim 1, wherein the shared communication messages comprise at least one of comments, replies, status updates, digital photos, digital videos and activity messages associated with the participants.

8. The method of claim 1, wherein the shared communication messages comprise at least one of mobile device messages, email messages and instant messages.

9. The method of claim 1, further comprising:
    transmitting an invitation message to each of the participants; and
    receiving a confirmation indication from at least one of the participants, wherein the conversation window displays the collection of contact icons to respectively correspond to the at least one of the participants.

10. A system for presenting a group conversation on an electronic device of a user, the system comprising:
    one or more processors; and
    a machine-readable medium comprising instructions stored therein, which when executed by the processors, cause the processors to perform operations comprising:
        displaying, on a graphical user interface of the electronic device, a group of contacts with which the user can communicate, the group of contacts comprising one or more individual contacts and one or more preset collections of contacts associated with one another;
        receiving first user input via the graphical user interface, the first user input specifying a selection of at least one individual contact and at least one preset collection of contacts, from the group of contacts, as participants for a group conversation, wherein the group conversation provides for sharing communication messages among the participants;
        receiving second user input via the graphical user interface, the second user input comprising a communication message for inclusion in the group conversation;
        presenting a conversation window together with a first button on the graphical user interface based on the received first and second user input, wherein the conversation window displays a collection of contact icons with each contact icon respectively corresponding to one of the participants of the group conversation, and a conversation thread which includes the communication message, and wherein the first button is for displaying a participant list which includes all of the at least one individual contact and the at least one preset collection of contacts participating in the group conversation;
        receiving third user input via the first button;
        displaying, in response to the received third user input, the participant list together with a second button, wherein the second button is for creating a new preset collection of contacts with all participants in the participant list;
        receiving fourth user input via the second button; and
        creating, in response to the received fourth user input, the new preset collection of contacts with all participants in the participant list.

11. A machine-readable medium comprising instructions stored therein, which when executed by a machine, cause the machine to perform operations comprising:

displaying, on a graphical user interface of an electronic device of a user, a group of contacts with which the user can communicate, the group of contacts comprising one or more individual contacts and one or more preset collections of contacts associated with one another;

receiving first user input via the graphical user interface, the first user input specifying a selection of at least one individual contact and at least one preset collection of contacts, from the group of contacts, as participants for a group conversation, wherein the group conversation provides for sharing communication messages among the participants;

presenting a conversation window together with a first button on the graphical user interface based on the first user input, wherein the conversation window displays a collection of contact icons with each contact icon respectively corresponding to one of the participants of the group conversation, and a conversation thread with the shared communication messages, and wherein the first button is for displaying a participant list which includes all of the at least one individual contact and the at least one preset collection of contacts participating in the group conversation;

receiving a communication message for inclusion in the group conversation from the user via the graphical user interface;

updating the conversation window to display the communication message within the conversation thread;

receiving second user input via the first button;

displaying, in response to the received second user input, the participant list together with a second button, wherein the second button is for creating a new preset collection of contacts with all participants in the participant list;

receiving third user input via the second button; and creating, in response to the received third user input, the new preset collection of contacts with all participants in the participant list.

12. The system of claim 10, wherein the group conversation is initiated by the displaying, receiving and presenting steps.

13. The system of claim 10, wherein the group conversation is in progress with existing participants prior to the displaying step, and wherein participants are added to the group conversation by the displaying, receiving and presenting steps, the method further comprising:

receiving a request from the user via the graphical user interface prior to the displaying step, the request for adding participants to the group conversation, wherein the selection of participants corresponds to the added participants, and wherein the conversation window displays the collection of contact icons with each contact icon respectively corresponding to one of the existing participants or the added participants.

14. The system of claim 10, wherein the group conversation is coordinated between the participants using a server.

15. The system of claim 10, wherein the group conversation corresponds to peer-to-peer communication between the participants, and wherein the group conversation coordinated by electronic devices of the participants.

16. The system of claim 10, wherein the shared communication messages comprise at least one of comments, replies, status updates, digital photos, digital videos and activity messages associated with the participants.

17. The system of claim 10, wherein the shared communication messages comprise at least one of mobile device messages, email messages and instant messages.

18. The system of claim 10, further comprising:
transmitting an invitation message to each of the participants; and
receiving a confirmation indication from at least one of the participants, wherein the conversation window displays the collection of contact icons to respectively correspond to the at least one of the participants.

19. The machine-readable medium of claim 11, wherein the group conversation is coordinated between the participants using a server.

20. The machine-readable medium of claim 11, wherein the group conversation corresponds to peer-to-peer communication between the participants, and wherein the group conversation coordinated by electronic devices of the participants.

21. The machine-readable medium of claim 11, wherein the shared communication messages comprise at least one of comments, replies, status updates, digital photos, digital videos and activity messages associated with the participants.

* * * * *